United States Patent
Bank et al.

(10) Patent No.: US 9,928,087 B2
(45) Date of Patent: Mar. 27, 2018

(54) STATE-PRESERVING REVERSIBLE CONFIGURATION CHANGE

(71) Applicant: International Business Machines Corporation, Armonk, NY (US)

(72) Inventors: Judith H. Bank, Cary, NC (US); Lisa M. Bradley, Cary, NC (US); Sun Lin, Morrisville, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 14/326,834

(22) Filed: Jul. 9, 2014

(65) Prior Publication Data
US 2016/0011888 A1 Jan. 14, 2016

(51) Int. Cl.
G06F 9/44 (2006.01)
G06F 9/445 (2018.01)

(52) U.S. Cl.
CPC .............................. G06F 9/44505 (2013.01)

(58) Field of Classification Search
CPC ............. G06F 9/44505; G06F 11/3024; G06F 11/3055
See application file for complete search history.

(56) References Cited

U.S. PATENT DOCUMENTS

| | | | | |
|---|---|---|---|---|
| 6,546,554 | B1 * | 4/2003 | Schmidt | G06F 8/61 709/201 |
| 6,571,389 | B1 * | 5/2003 | Spyker | G06F 9/44505 709/242 |
| 7,743,421 | B2 | 6/2010 | Cosquer et al. | |
| 8,166,140 | B1 | 4/2012 | Schafer et al. | |
| 2003/0033344 | A1 * | 2/2003 | Abbott | G06F 9/4435 718/1 |
| 2005/0097082 | A1 * | 5/2005 | Yan | G06F 9/45516 |
| 2006/0104220 | A1 | 5/2006 | Yamazaki et al. | |
| 2006/0112311 | A1 * | 5/2006 | Cobb | G06F 9/4411 714/16 |
| 2008/0126959 | A1 | 5/2008 | Naick et al. | |
| 2008/0155216 | A1 * | 6/2008 | Shoham | G06F 11/1417 711/162 |

(Continued)

*Primary Examiner* — Jaweed A Abbaszadeh
*Assistant Examiner* — Gary Collins
(74) *Attorney, Agent, or Firm* — Garg Law Firm, PLLC; Rakesh Garg; Robert C. Bunker

(57) ABSTRACT

At a system configured according to a first configuration, an activity that uses a second configuration is detected. A set of changes is determined, which when applied to the first configuration result in the second configuration. State information of a second activity at the system is saved. The set of changes is applied to the first configuration to operate the system under the second configuration. The activity is performed under the second configuration until completion. A portion of the set of changes is removed from a portion of the second configuration such that the portion of the second configuration reverts to a corresponding portion of the first configuration. The second activity is resumed using the saved state information. The state information is sufficient to resume the second activity after the activity has completed and from a point reached in the second activity before the applying of the set of changes.

16 Claims, 6 Drawing Sheets

(56) References Cited

U.S. PATENT DOCUMENTS

| | | | |
|---|---|---|---|
| 2009/0158295 A1* | 6/2009 | Burg | G06F 11/1438 718/108 |
| 2010/0332043 A1* | 12/2010 | Weyland | G06F 1/3296 700/291 |
| 2012/0011561 A1 | 1/2012 | Courtney et al. | |
| 2012/0159566 A1 | 6/2012 | Hrastnik et al. | |
| 2013/0166899 A1 | 6/2013 | Courtney et al. | |
| 2014/0059528 A1* | 2/2014 | Gagliardi | G06F 8/67 717/170 |

\* cited by examiner

STATE-PRESERVING REVERSIBLE CONFIGURATION CHANGE

TECHNICAL FIELD

The present invention relates generally to a method, system, and computer program product for facilitating the operation of a computer under different configurations. More particularly, the present invention relates to a method, system, and computer program product for state-preserving reversible configuration change.

BACKGROUND

A data processing system operates according to the criteria and specifications provided in one or more configuration files or data structures. For example, when executing an application on a computer, the registry of the computer provides the information of which software components to use, version and dependency information about those components, certain parameters used by those components, and so on.

When a user invokes an application on a computer, establishes a session with an application on another computer, or begins a transaction with another system, certain requirements of those other systems or applications have to be met at the user's computer for the invocation, session, or transaction to be successful. For example, a configuration file associated with the application provides further information about the required infrastructure components and their versions, user-specified parameters, default attributes of the application, and so on.

Websites often require certain plug-ins to be available at the user's computer. For example, a website that provides audio/video content requires one or more specific codec plug-in that is capable of decoding the media content stream from the website. Systems such as online banking, secure database access applications, and the like require specific versions of technological components, such as Java, to be running on the user's computer (Java and all Java-based trademarks and logos are trademarks or registered trademarks of Oracle Corporation and/or its affiliates.)

SUMMARY

The illustrative embodiments provide a method, system, and computer program product for state-preserving reversible configuration change. An embodiment includes a method for state-preserving reversible configuration change. The embodiment detects, at a data processing system configured according to a first configuration, an activity that uses a second configuration. The embodiment determines a set of changes, wherein the set of changes when applied to the first configuration result in the second configuration. The embodiment saves a state information of a second activity at the data processing system. The embodiment applies the set of changes to the first configuration to operate the data processing system under the second configuration. The embodiment performs the activity under the second configuration until the activity is complete. The embodiment removes at least a portion of the set of changes from a portion of the second configuration such that the portion of the second configuration reverts to a corresponding portion of the first configuration. The embodiment resumes the second activity using the saved state information, wherein the state information is sufficient to resume the second activity after the activity has completed and from a point reached in the second activity before the applying of the set of changes.

Another embodiment includes a computer usable program product comprising a computer readable storage device including computer usable code for state-preserving reversible configuration change. The embodiment further includes computer usable code for detecting, at a data processing system configured according to a first configuration, an activity that uses a second configuration. The embodiment further includes computer usable code for determining a set of changes, wherein the set of changes when applied to the first configuration result in the second configuration. The embodiment further includes computer usable code for saving a state information of a second activity at the data processing system. The embodiment further includes computer usable code for applying the set of changes to the first configuration to operate the data processing system under the second configuration. The embodiment further includes computer usable code for performing the activity under the second configuration until the activity is complete. The embodiment further includes computer usable code for removing at least a portion of the set of changes from a portion of the second configuration such that the portion of the second configuration reverts to a corresponding portion of the first configuration. The embodiment further includes computer usable code for resuming the second activity using the saved state information, wherein the state information is sufficient to resume the second activity after the activity has completed and from a point reached in the second activity before the applying of the set of changes.

Another embodiment includes a data processing system for state-preserving reversible configuration change. The embodiment further includes a storage device including a storage medium, wherein the storage device stores computer usable program code. The embodiment further includes a processor, wherein the processor executes the computer usable program code. The embodiment further includes computer usable code for detecting, at a data processing system configured according to a first configuration, an activity that uses a second configuration. The embodiment further includes computer usable code for determining a set of changes, wherein the set of changes when applied to the first configuration result in the second configuration. The embodiment further includes computer usable code for saving a state information of a second activity at the data processing system. The embodiment further includes computer usable code for applying the set of changes to the first configuration to operate the data processing system under the second configuration. The embodiment further includes computer usable code for performing the activity under the second configuration until the activity is complete. The embodiment further includes computer usable code for removing at least a portion of the set of changes from a portion of the second configuration such that the portion of the second configuration reverts to a corresponding portion of the first configuration. The embodiment further includes computer usable code for resuming the second activity using the saved state information, wherein the state information is sufficient to resume the second activity after the activity has completed and from a point reached in the second activity before the applying of the set of changes.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
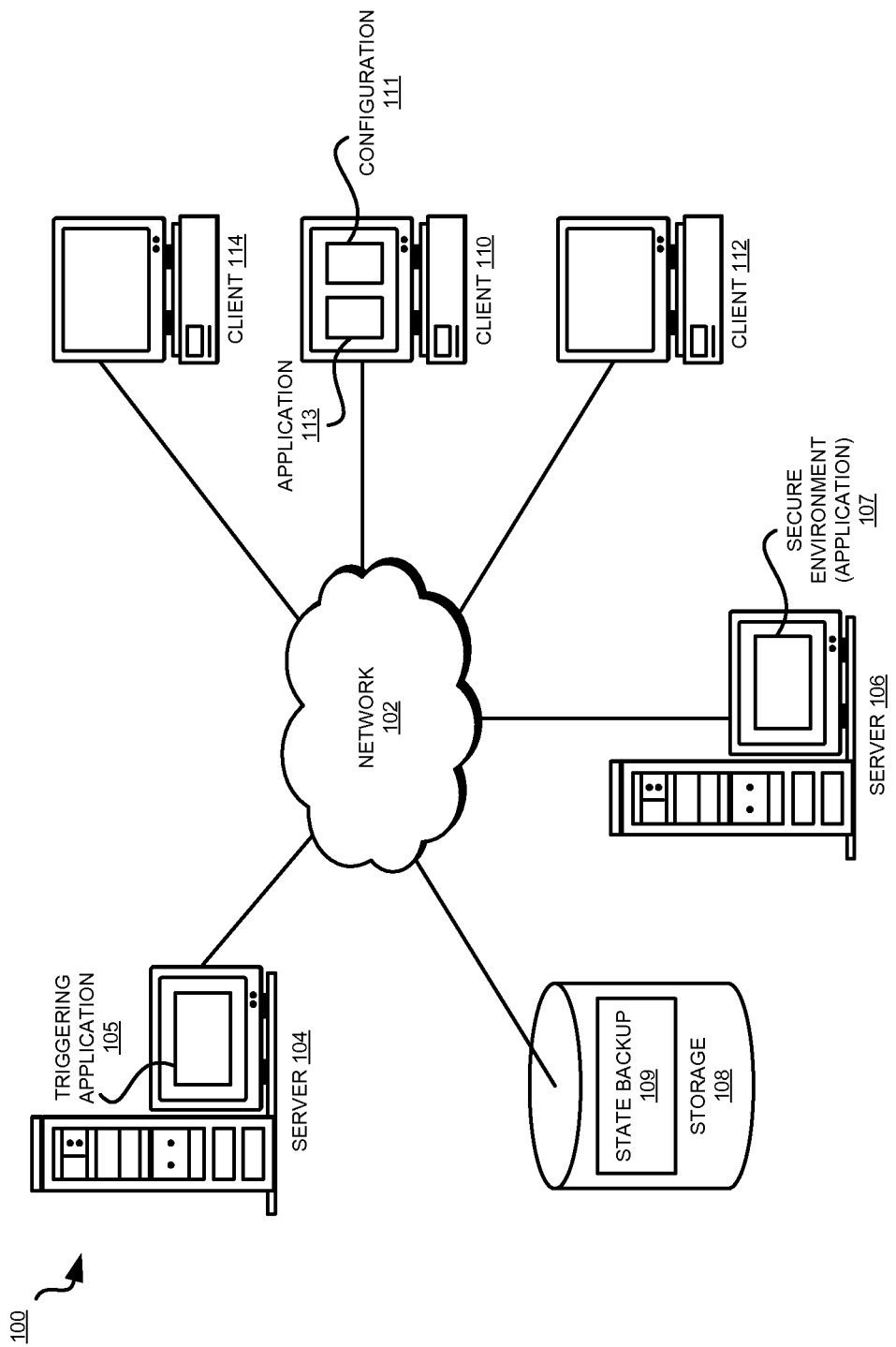
FIG. 1 depicts a block diagram of a network of data processing systems in which illustrative embodiments may be implemented.

Within the scope of the illustrative embodiments, a "configuration" comprises any information, stored in any suitable manner, and usable to configure a data processing system to operate with an application, whether the application is executing locally on the data processing system or remotely on a different data processing system with which the data processing system communicates. Examples of a configuration include, but are not limited to, a registry in a computer, a configuration file associated with an application, and a specification associated with a technology, tool, or system.

The illustrative embodiments recognize that often, a data processing system is configured according to a given configuration (original or normal configuration), and an interaction with an application, a session, a transaction, or an operation with a system (collectively, "activity") requires a different configuration. For example, the data processing system may be configured to execute Java version 7.x but when a user attempts to use the data processing system to establish a session with another system, such as a database access or a video conference session, the user is informed that such activity requires Java 6.x to be executing on the user's data processing system.

The illustrative embodiments recognize that such changes in configuration of a data processing system can be disruptive. For example, if the data processing system is switched from Java 7.x to Java 6.x to enable the activity, other applications executing on the data processing system may cease working or crash. As another example, activating or deactivating a certain application at the data processing system so that the activity can proceed can cause a security breach, policy violation, or render a security measure ineffective. As another example, when an inexperienced user changes a configuration of the data processing system, a risk of corrupting the configuration is heightened and can render the data processing system inoperational.

The illustrative embodiments further recognize that often, the configuration of a data processing system has to be changed in multiple places in multiple different ways. The illustrative embodiments recognize that managing such configuration changes manually is tedious and error-prone even for expert users, and can be disastrous for less experienced users.

Furthermore, the illustrative embodiments recognize that once the activity that requires the configuration change has been completed, it is desirable to return the data processing system to the normal configuration. Again, the illustrative embodiments recognize that the numerous locations and types of the configuration changes make such reversal just as difficult, if not more so, as compared to making the configuration change in the first place.

Additionally, operations that were underway under the normal configuration prior to the configuration change usually are disrupted by the configuration change. Such operations have to be reinitiated and re-performed when the normal configuration is restored after a configuration change, resulting in a loss of work performed, repetition of steps, duplication of effort, increased computer resource usage, and sometimes errors due to previously incomplete or disrupted operations.

The illustrative embodiment also recognizes that some data processing environments, such as corporate intranets, virtual private networks (VPNs), and the like, usually require that the data processing system accessing them be configured in a particular manner. Any deviation from that configuration, such as by using different profiles for different configurations on the same data processing system, often prevents access to those environments or creates other compliance issues.

The illustrative embodiments used to describe the invention generally address and solve the above-described problems and other problems related to changing a configuration of a data processing system for certain activities. The illustrative embodiments provide a method, system, and computer program product for state-preserving reversible configuration change.

An embodiment allows a user to engage in activities that require configuration changes in a way that the changes are automatically reversed once such an activity has completed or terminated. An embodiment detects an event, action, operation, or a sequence thereof, (collectively, "trigger") that will lead to a configuration change. In some cases, the user opening a session, launching an application, sending a command, initiating a transaction, or providing an input acts as a trigger.

In some other cases, the user accessing a remote application acts as a trigger. In some other cases, a notation of an impending activity, such as a meeting schedule in a scheduling application, acts as a trigger when the meeting will use an application that requires configuration changes, e.g., a particular video conferencing application which uses a particular plug-in and requires cookies acceptance to be enabled.

An embodiment can further use historical patterns of operations on the data processing system to identify triggers. For example, the embodiment stores one or more historical records of operations and sequence of operations performed on a data processing system such that the sequence leads to and includes an operation that requires a configuration change. Such a pattern is referred to herein as a triggering pattern. When the embodiment observes a portion of a triggering pattern at a later time, the embodiment determines that the operation that requires the configuration change is likely to occur thereafter in the future. One embodiment proactively undertakes other actions pertaining to state-preserving reversible configuration change as described herein in response to such a determination. Another embodiment prepares to undertake other actions pertaining to state-preserving reversible configuration change as described herein in response to such a determination. Another embodiment notifies a user about an impending configuration change for which the embodiment can undertake other actions pertaining to state-preserving reversible configuration change as described herein if the user so instructs.

Upon detecting a trigger or a triggering pattern for which the configuration has to be changed, an embodiment determines a set of configuration changes that has to be made or applied to the current configuration. The current configuration may be the original configuration of the data processing system, or may be the configuration reached in a previous iteration of configuration change when an embodiment applies the configuration changes in several iterations, some changes at a time.

Once the set of changes has been identified, an embodiment determines whether some or all of the configuration changes are temporary. In other words, the embodiment determines whether some or all of the configuration changes in the set will have to be undone or reversed once the triggering activity has ended. If some of the configuration changes are to be permanently applied to the data processing system, the embodiment does not reverse those changes after the triggering activity has ended.

One embodiment makes the reversal and non-reversal determination for a configuration change based on a user=specified preference. Another embodiment makes a similar determination based on a policy. Another embodiment makes such determinations based on best practices or other considerations.

An embodiment identifies the applications, operations, sessions, communications, transmissions, transactions, or other activities in progress under the current configuration of the data processing system (current activities). The embodiment records data from such current activities, e.g., the state data of one or more current activities, that is sufficient to temporarily pause or hold the current state of the current activities for the duration while configuration changes are in effect, and to restore the current activities to their corresponding current states once the configuration changes have been reversed. An embodiment thus saves the state of a current activity prior to a configuration change and resumes the current activity after reversing the configuration changes.

An embodiment applies the set of configuration changes to the current configuration in one or more iterative steps of changing the configuration. When the changes are applied to a configuration in more than one steps, an embodiment tracks the order in which the changes are applied to the configuration to facilitate the reversal in a corresponding reverse order during the reversal steps.

Once an embodiment determines that a triggering activity has terminated, the embodiment reverses the temporary configuration changes. One embodiment reverses the temporary configuration changes in any suitable sequence or order. Another embodiment reverses the temporary configuration changes in an order or sequence corresponding to the order or sequence of applying those changes. An embodiment restores the state information of a current activity to resume the current activity from the point where the current activity was paused or held prior to the configuration change.

The illustrative embodiments are described with respect to certain types of configuration information, configuration changes, triggers, triggering activities, current activities, inputs, preferences, state information, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
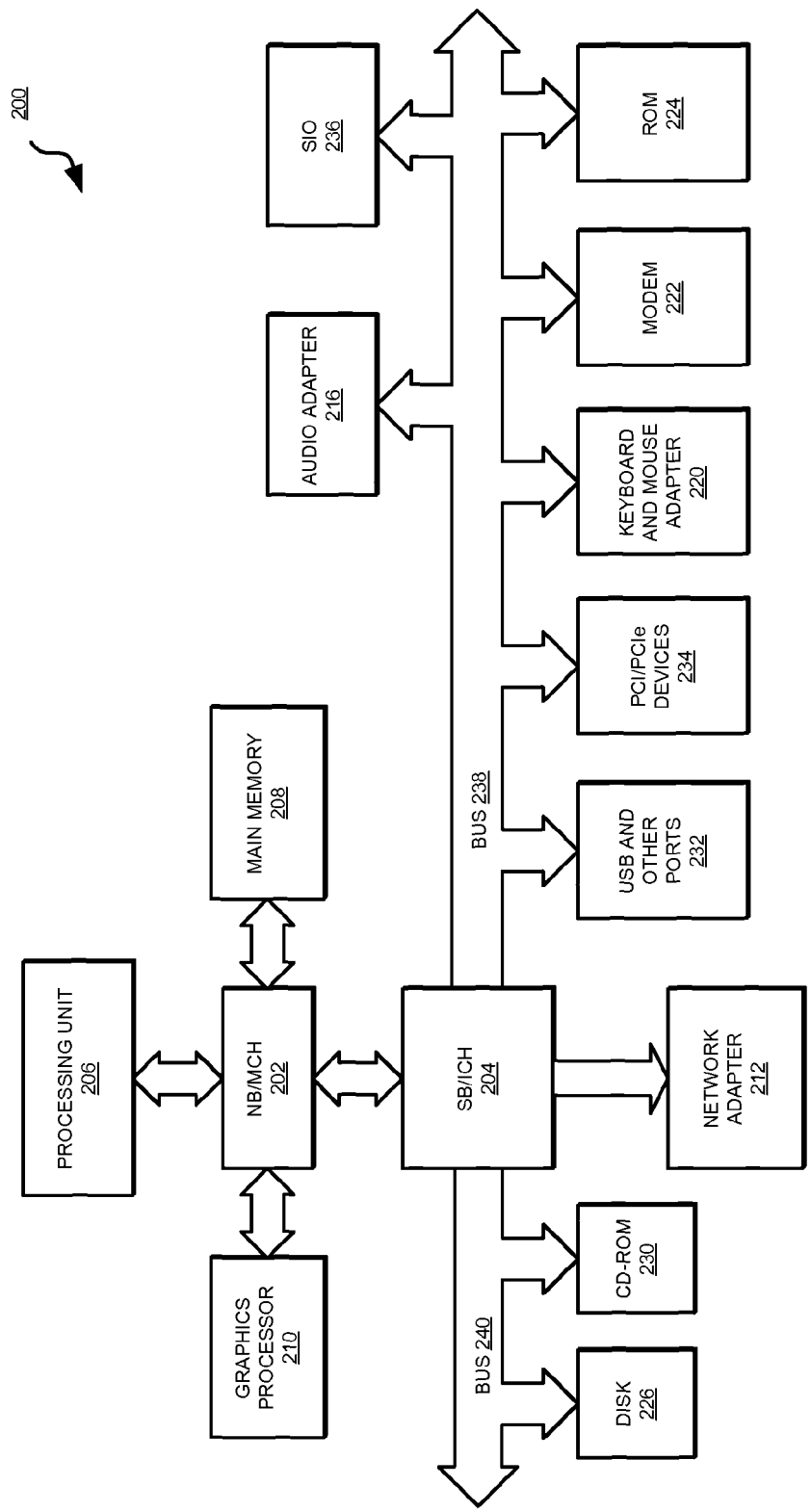
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Configuration 111 in client 110 is a configuration that be changed from a normal or current configuration state to a changed configuration state according to an embodiment. Application 113 implements one or more embodiments described herein. State backup 109 comprises state information of one or more current activities on client 110 usable for pausing the current activity at a particular state and restoring the current activity from that state as described herein. Secure environment or application 107 comprises a data processing environment or access thereto, which limits or prohibits a user of client 110 from using different profiles with different configurations on client 110. Triggering application 105 is an application, an interaction with which is a triggering activity (e.g., a web server), or an information in an application where the information is indicative of a triggering activity (e.g., a meeting appointment in a calendaring application).

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as configuration 111, application 113, triggering application 105, and secure environment or application 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
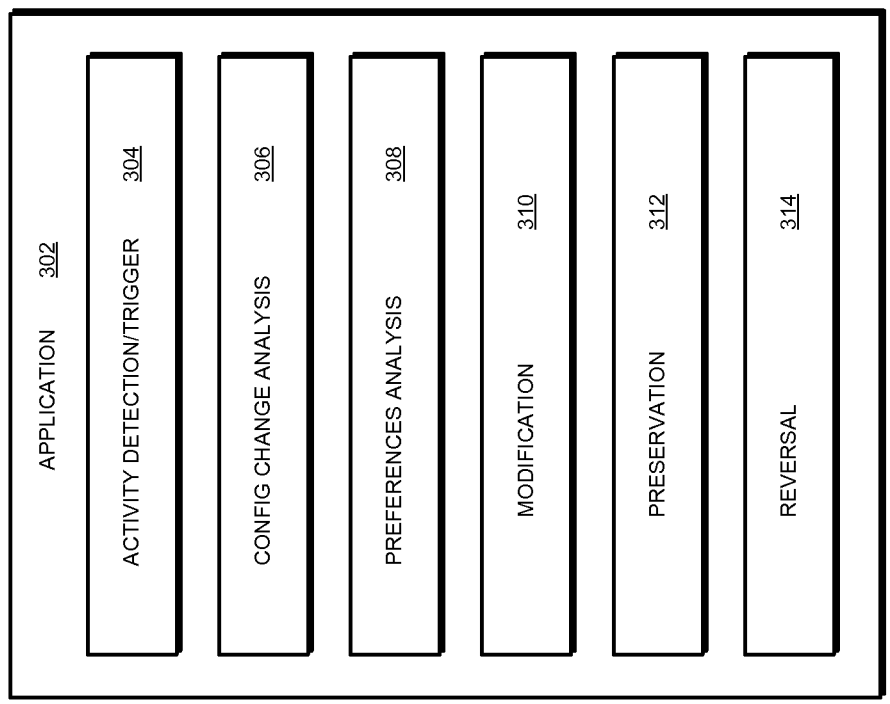
FIG. 3 depicts a block diagram of an example application for state-preserving reversible configuration change in accordance with an illustrative embodiment.

With reference to FIG. 3, this figure depicts a block diagram of an example application for state-preserving reversible configuration change in accordance with an illustrative embodiment. Application 302 is an example of application 113 in FIG. 1.

Component 304 detects an activity, e.g., a trigger, which requires a change in the configuration of the data processing system where application 302 is executing. Component 304 detects a trigger that results from an action of a user, an operation of another application, a communication with another application or system, or any of several other operations, which will become apparent to those of ordinary skill in the art from this disclosure. Component 304 is also configured to detect a future trigger, such as by examining a sequence of operations or events occurring on the data processing system, and matching a portion of the sequence with a stored triggering pattern. Historical triggering patterns can be stored in the data processing system, e.g., client 110 in FIG. 1, or can be stored in a location accessible to the data processing system, e.g., in storage 108 in FIG. 1.

Component 306 analyzes the current configuration to determine a set of changes that are to be applied to the current configuration. For example, when component 304 detects a present or impending trigger, component 306 is able to determine the changed configuration that is expected by the application or operation causing the configuration change trigger. Component 306 generates a set of configuration changes that will change the configuration from the current state to the changed state required by the application or operation causing the trigger.

Component 308 identifies those changes in the set of changes produced by component 306, which are temporary and will have to be reversed once the triggering activity has ended. For example, if one of the temporary changes is enabling cookies to allow the user to use a video conferencing application, the cookies will have to be disabled once the video conference is over and the user has terminated the video conferencing application. As another example, if one of the temporary changes is installing a plug-in to allow the user to use a website, the plug-in will have to be disabled or uninstalled once the website is not active in the browser.

The example ways of determining an end of the triggering activity are not intended to be limiting on the illustrative embodiments. With the help of this disclosure, those of ordinary skill in the art will be able to determine the end of a triggering activity in other ways and thereby determine a suitable time for the reversal of the temporary configuration changes, and the same are contemplated within the scope of the illustrative embodiments.

Component 310 modifies the current configuration by applying the set of changes generated from component 306. Component 310 can perform the modification all in a single step, or some changes at a time in more than one steps or iterations.

Component 312 preserves the state information of any current activities that have to be resumed after the triggering activity has ended. When needed, component 312 also stores the sequence in which the changes are applied to the configuration to reach the changed configuration state.

Component 314 reverses or otherwise removes those changes from the set generated by component 306, which are identified as temporary by component 308, thereby restoring at least a part of the changed configuration to a corresponding part of the original configuration. For example, if a change in the set of changes was identified as permanent, or not temporary, component 314 does not remove that change, and the corresponding portion of the changed configuration becomes a part of a new original configuration. If component 312 has saved a sequencing information pertaining to the sequence or order in which the changes were applied to the configuration, component 314 reverses or removes the temporary changes in a corresponding reverse order.

Figure 4:
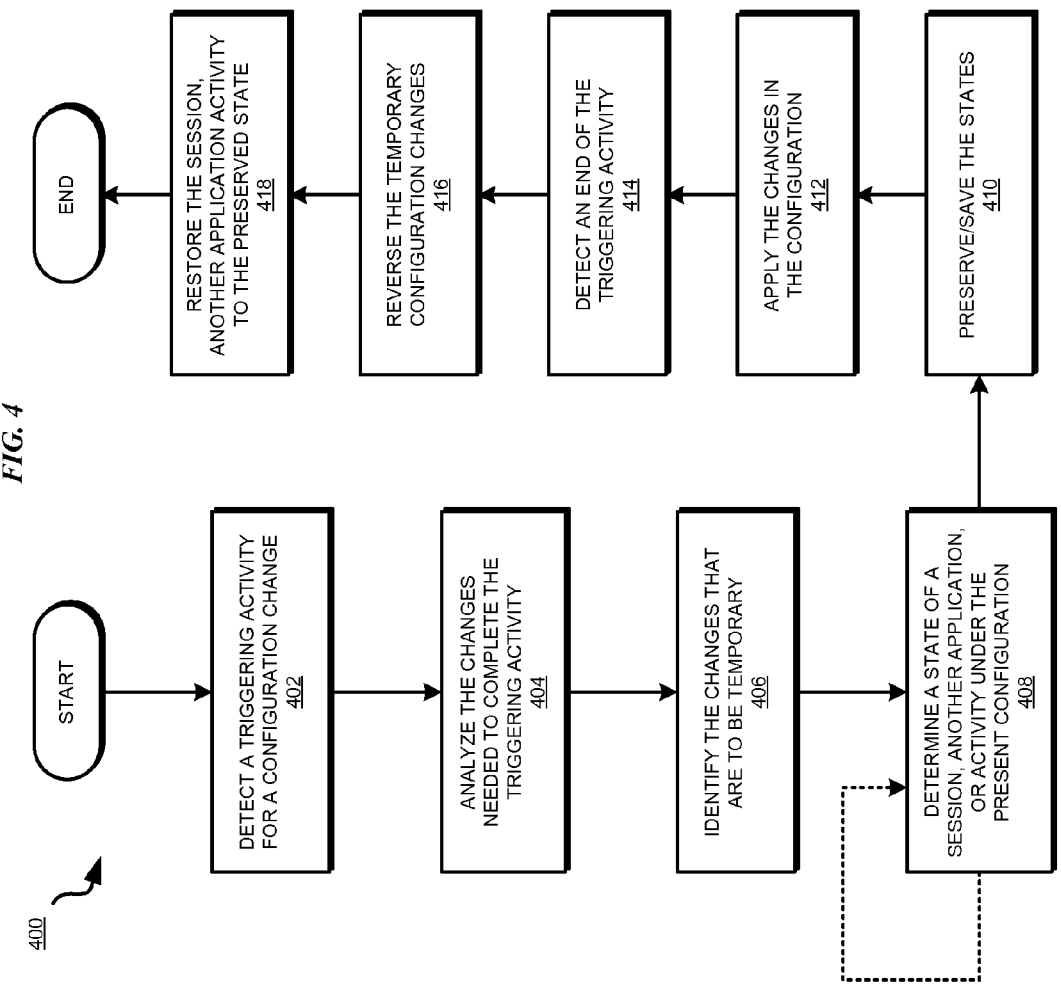
FIG. 4 depicts a flowchart of an example process for state-preserving reversible configuration change in accordance with an illustrative embodiment.

With reference to FIG. 4, this figure depicts a flowchart of an example process for state-preserving reversible configuration change in accordance with an illustrative embodiment. Process 400 can be implemented in application 302 in FIG. 3.

The application detects a triggering activity that calls for a configuration change (block 402). The application analyzes the changes to the configuration that are needed to complete the triggering activity (block 404). The application identifies those changes that are temporary and should be reversed or removed from the changed configuration when the triggering activity has completed (block 406).

The application determines a state of a current activity, e.g., a state of a session, another application, operation or activity under the present or current configuration (block 408). The application determines the state information of any number of current activities by performing or repeating the operation of block 408.

The application preserves the state information of the current activities determined in block 408 (block 410). The application applies the changes identified and analyzed in block 404 to the configuration available before executing block 402 (block 412). The operation of block 412 results in a changed configuration.

The application detects an end of the triggering activity (block 414). The application reverses or otherwise removes those changes from the changed configuration of block 412 that were identified as temporary at block 406 (block 416). The reversal or removal of a change from a portion of the changed configuration restores that portion of the changed configuration to the corresponding portion of the configuration that was available before block 402.

The application restores a current activity using the preserved state information from that current activity at blocks 408 and 410 (block 418). The application ends process 400 thereafter.

Figure 5:
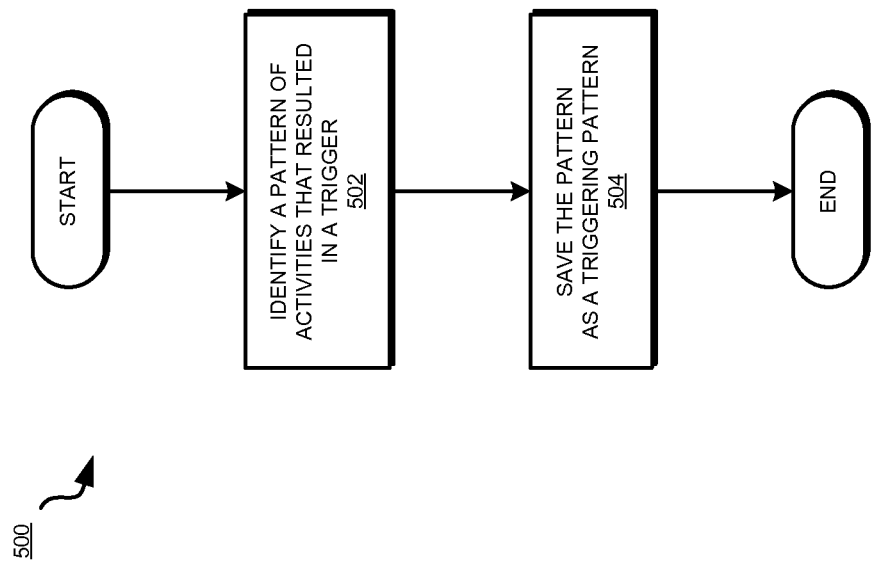
FIG. 5 depicts a flowchart of an example process for using historical record of activities information to predict an impending triggering activity in accordance with an illustrative embodiment.

With reference to FIG. 5, this figure depicts a flowchart of an example process for using historical record of activities information to predict an impending triggering activity in accordance with an illustrative embodiment. Process 500 can be implemented in application 302 in FIG. 3.

The application, using historical information about sequence of actions, activities, events, invocations, transmissions, or other operations, identifies a sequence, order, or other pattern of activities that resulted in a trigger for changing a configuration in the past (block 502). The application saves the sequence, order, or other pattern as a triggering pattern (block 504). The application ends process 500 thereafter.

In one embodiment, the triggering pattern has to occur a threshold number of times in the historical data before the embodiment will save the triggering pattern for future use. In another embodiment, two sequences, orders, or other patterns identified in block 502 can vary from one another by up to a threshold amount, e.g., by a threshold number of activities in the pattern for the embodiment to still recognize the two patterns as the same triggering pattern.

Figure 6:
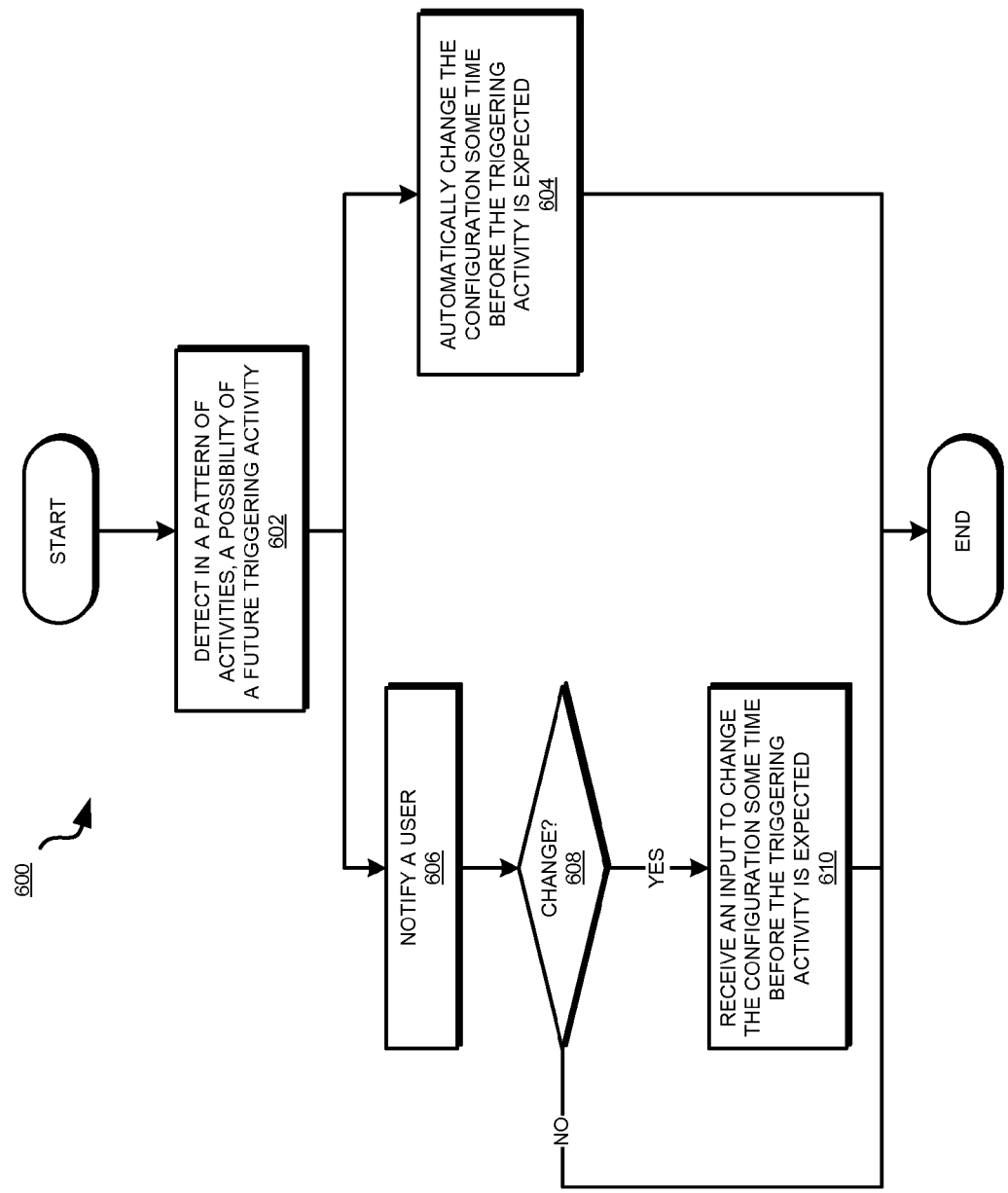
FIG. 6 depicts a flowchart of an example process for predicting a future need for changing the configuration in accordance with an illustrative embodiment.

With reference to FIG. 6, this figure depicts a flowchart of an example process for predicting a future need for changing the configuration in accordance with an illustrative embodiment. Process 600 can be implemented in application 302 in FIG. 3.

The application detects a pattern of current activities, wherein exists a possibility of a future trigger or triggering activity (block 602). For example, the application matches a current pattern of activities with a portion of a saved triggering pattern from process 500 in FIG. 5. If a portion of a threshold size from the historical triggering pattern matches the current pattern, the application confirms a possibility that the current pattern of activities will lead to the same trigger that was observed in the historical triggering pattern whose portion matched.

The application can take one of two branches following the detection or confirmation of such a possibility. According to a first branch, the application automatically changes the configuration, such as according to process 400 in FIG. 4, some time before the trigger is expected in the current pattern of activities (block 604). The application ends process 600 thereafter.

According to a second branch, the application notifies a user about the detected possibility (block 606). The application determines if the user wants to change the configuration responsive to the notification (block 608). If the user does not wish to change the configuration ("No" path of block 608), the application ends process 600 thereafter.

If the user confirms that the configuration should be changed ("Yes" path of block 608), the application receives an input from the user, e.g., the same confirmation that allows the application to take the "Yes" path from block 608 or a different input later, and changes the configuration, such as according to process 400 in FIG. 4, some time before the trigger is expected in the current pattern of activities (block 610). The application ends process 600 thereafter.

Thus, a computer implemented method, system or apparatus, and computer program product are provided in the illustrative embodiments for state-preserving reversible configuration change.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for state-preserving reversible configuration change, the method comprising:

detecting, at a data processing system configured according to a first configuration, an activity that uses a second configuration;

determining a set of changes, wherein the set of changes when applied to the first configuration result in the second configuration;

saving a state information of a second activity at the data processing system;

applying the set of changes to the first configuration to operate the data processing system under the second configuration;

pausing the second activity for a duration during which the second configuration is effective in the data processing system;

performing the activity under the second configuration until the activity is complete;

removing at least a portion of the set of changes from a portion of the second configuration such that the portion of the second configuration reverts to a corresponding portion of the first configuration;

resuming, from the pausing and after the duration, the second activity using the saved state information, wherein the state information is sufficient to resume the second activity after the activity has completed and from a point reached in the second activity before the applying of the set of changes, instead of reinitiating and re-performing the second activity upon restoring the first configuration in the data processing system;

storing information about a set of activities occurring in the data processing system at a first time, the stored information about the set of activities forming a historical record of activities;

identifying in the historical record of activities a sequence of activities, wherein the sequence ends in an instance of the activity;

saving the sequence as a pattern;

determining that a threshold portion of the pattern matches a second sequence of activities occurring at a second time prior to the activity, wherein the second time is later than the first time; and predicting that the activity will occur at a future time after the second time, wherein the detecting the activity occurs at the future time.

2. The method of claim 1, further comprising:

notifying, responsive to the predicting, a user about the second configuration used by the activity, wherein the applying the set of changes is responsive to an input from the user, the input being responsive to the notifying.

3. The method of claim 1, further comprising:

automatically initiating the applying the set of changes at the future time.

4. The method of claim 1, further comprising:

detecting that an application engaged in the activity has terminated; and concluding that the activity is complete.

5. The method of claim 1, further comprising:

identifying a subset of the set of changes as temporary changes, a temporary change in the subset is a change that has to be removed from the second configuration after the activity has completed.

6. The method of claim 1, wherein a change in the set of changes comprises reducing a version of a software component to a lower version as compared to a version in the first configuration.

7. The method of claim 1, wherein a change in the set of changes comprises activating an application that is prevented from activation in the first configuration.

8. The method of claim 1, wherein a change in the set of changes comprises using an application whose use is disallowed in the first configuration.

9. The method of claim 1, further comprising:
identifying the second activity, wherein the second activity is occurring at the data processing system under the first configuration; and
determining the state information at a point where the second activity is paused for changing the first configuration to the second configuration.

10. A computer usable program product comprising a computer readable storage device including computer usable code for state-preserving reversible configuration change, the computer usable code comprising:
computer usable code for detecting, at a data processing system configured according to a first configuration, an activity that uses a second configuration;
computer usable code for determining a set of changes, wherein the set of changes when applied to the first configuration result in the second configuration;
computer usable code for saving a state information of a second activity at the data processing system;
computer usable code for applying the set of changes to the first configuration to operate the data processing system under the second configuration;
computer usable code for pausing the second activity for a duration during which the second configuration is effective in the data processing system;
computer usable code for performing the activity under the second configuration until the activity is complete;
computer usable code for removing at least a portion of the set of changes from a portion of the second configuration such that the portion of the second configuration reverts to a corresponding portion of the first configuration;
computer usable code for resuming, from the pausing and after the duration, the second activity using the saved state information, wherein the state information is sufficient to resume the second activity after the activity has completed and from a point reached in the second activity before the applying of the set of changes, instead of reinitiating and re-performing the second activity upon restoring the first configuration in the data processing system;
computer usable code for storing information about a set of activities occurring in the data processing system at a first time, the stored information about the set of activities forming a historical record of activities;
computer usable code for identifying in the historical record of activities a sequence of activities, wherein the sequence ends in an instance of the activity;
computer usable code for saving the sequence as a pattern;
computer usable code for determining that a threshold portion of the pattern matches a second sequence of activities occurring at a second time prior to the activity, wherein the second time is later than the first time; and
computer usable code for predicting that the activity will occur at a future time after the second time, wherein the detecting the activity occurs at the future time.

11. The computer usable program product of claim 10, further comprising:
computer usable code for notifying, responsive to the predicting, a user about the second configuration used by the activity, wherein the applying the set of changes is responsive to an input from the user, the input being responsive to the notifying.

12. The computer usable program product of claim 10, further comprising:
computer usable code for automatically initiating the applying the set of changes at the future time.

13. The computer usable program product of claim 10, further comprising:
computer usable code for detecting that an application engaged in the activity has terminated; and
computer usable code for concluding that the activity is complete.

14. The computer usable program product of claim 10, wherein the computer usable code is stored in a computer readable storage medium in a data processing system, and wherein the computer usable code is transferred over a network from a remote data processing system.

15. The computer usable program product of claim 10, wherein the computer usable code is stored in a computer readable storage medium in a server data processing system, and wherein the computer usable code is downloaded over a network to a remote data processing system for use in a computer readable storage medium associated with the remote data processing system.

16. A data processing system for state-preserving reversible configuration change, the data processing system comprising:
a storage device including a storage medium, wherein the storage device stores computer usable program code; and
a processor, wherein the processor executes the computer usable program code, and wherein the computer usable program code comprises:
computer usable code for detecting, at a data processing system configured according to a first configuration, an activity that uses a second configuration;
computer usable code for determining a set of changes, wherein the set of changes when applied to the first configuration result in the second configuration;
computer usable code for saving a state information of a second activity at the data processing system;
computer usable code for applying the set of changes to the first configuration to operate the data processing system under the second configuration;
computer usable code for pausing the second activity for a duration during which the second configuration is effective in the data processing system;
computer usable code for performing the activity under the second configuration until the activity is complete;
computer usable code for removing at least a portion of the set of changes from a portion of the second configuration such that the portion of the second configuration reverts to a corresponding portion of the first configuration;
computer usable code for resuming, from the pausing and after the duration, the second activity using the saved state information, wherein the state information is sufficient to resume the second activity after the activity has completed and from a point reached in the second activity before the applying of the set of changes, instead of reinitiating and re-performing the second activity upon restoring the first configuration in the data processing system;

computer usable code for storing information about a set of activities occurring in the data processing system at a first time, the stored information about the set of activities forming a historical record of activities;

computer usable code for identifying in the historical record of activities a sequence of activities, wherein the sequence ends in an instance of the activity;

computer usable code for saving the sequence as a pattern;

computer usable code for determining that a threshold portion of the pattern matches a second sequence of activities occurring at a second time prior to the activity, wherein the second time is later than the first time; and computer usable code for predicting that the activity will occur at a future time after the second time, wherein the detecting the activity occurs at the future time.

* * * * *